United States Patent [19]
Costich

[11] Patent Number: 5,233,464
[45] Date of Patent: Aug. 3, 1993

[54] MULTILAYER INFRARED FILTER

[76] Inventor: Verne R. Costich, 150B Kittoe Dr., Mt. View, Calif. 94043

[21] Appl. No.: 672,855

[22] Filed: Mar. 20, 1991

[51] Int. Cl.⁵ .......................... G02B 5/28; F21V 9/04
[52] U.S. Cl. .................................. 359/359; 359/589; 359/900
[58] Field of Search ............... 359/359, 360, 586, 588, 359/589, 350, 900

[56] References Cited

U.S. PATENT DOCUMENTS

| | | | |
|---|---|---|---|
| 2,660,925 | 12/1953 | Turner | 359/359 |
| 3,000,375 | 9/1961 | Golay | 126/417 |
| 3,188,513 | 6/1965 | Hansler | 313/112 |
| 3,331,941 | 7/1967 | Edwards et al. | 392/408 |
| 3,551,017 | 12/1970 | Iwasaki et al. | 359/359 |
| 3,718,533 | 2/1973 | Shibata | 428/215 |
| 4,245,217 | 1/1981 | Steinhage | 340/555 |
| 4,284,323 | 8/1981 | Jankowitz | 359/360 |
| 4,504,109 | 3/1985 | Taga et al. | 359/359 |
| 4,726,655 | 2/1988 | Mahlein | 359/359 X |
| 4,854,670 | 8/1989 | Mellor | 359/359 |

FOREIGN PATENT DOCUMENTS 1523331 8/1978 United Kingdom ............... 359/589

Primary Examiner—Bruce Y. Arnold
Assistant Examiner—David R. Parsons
Attorney, Agent, or Firm—Robert O. Guillot

[57] ABSTRACT

An infrared filter that is formed as a laminated structure including a plurality of layers having substantially uniform thicknesses. The various embodiments include first layers that are relatively thick which are interleaved with second layers that are relatively thin as compared to the first layers. The second layers are generally one quarter wavelength optical thickness at a particular tuned wavelength, whereas the first layers are generally a plurality of quarter wavelength optical thicknesses. Methods for manufacturing the filters are described, including grinding and polishing procedures for obtaining the desired uniformity of thicknesses of said layers.

12 Claims, 3 Drawing Sheets

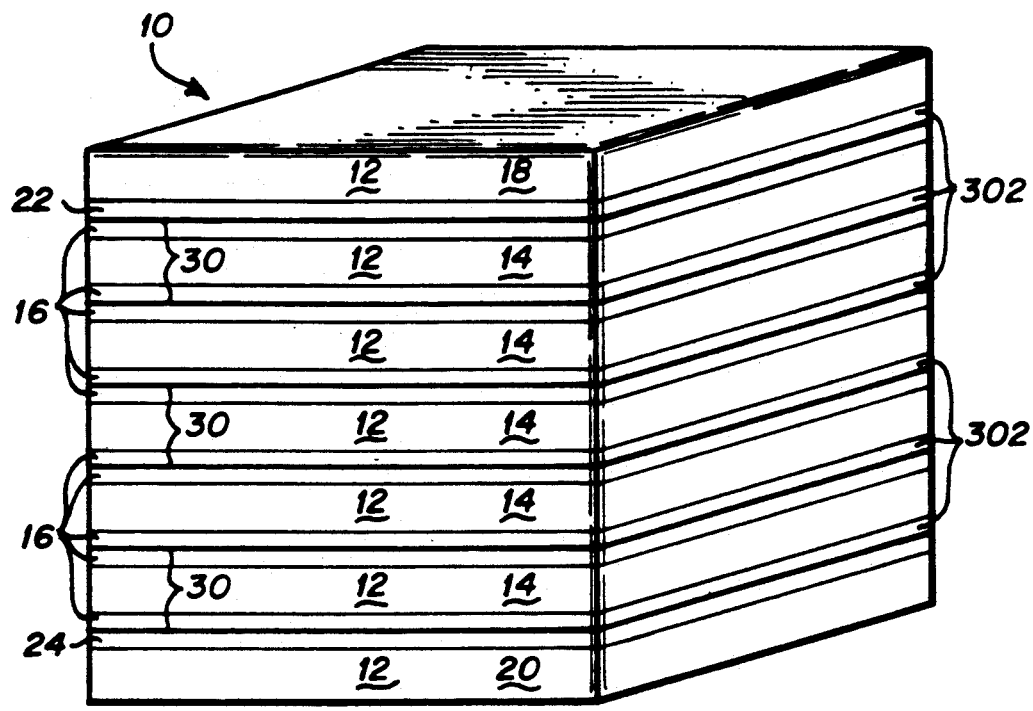
Fig_1
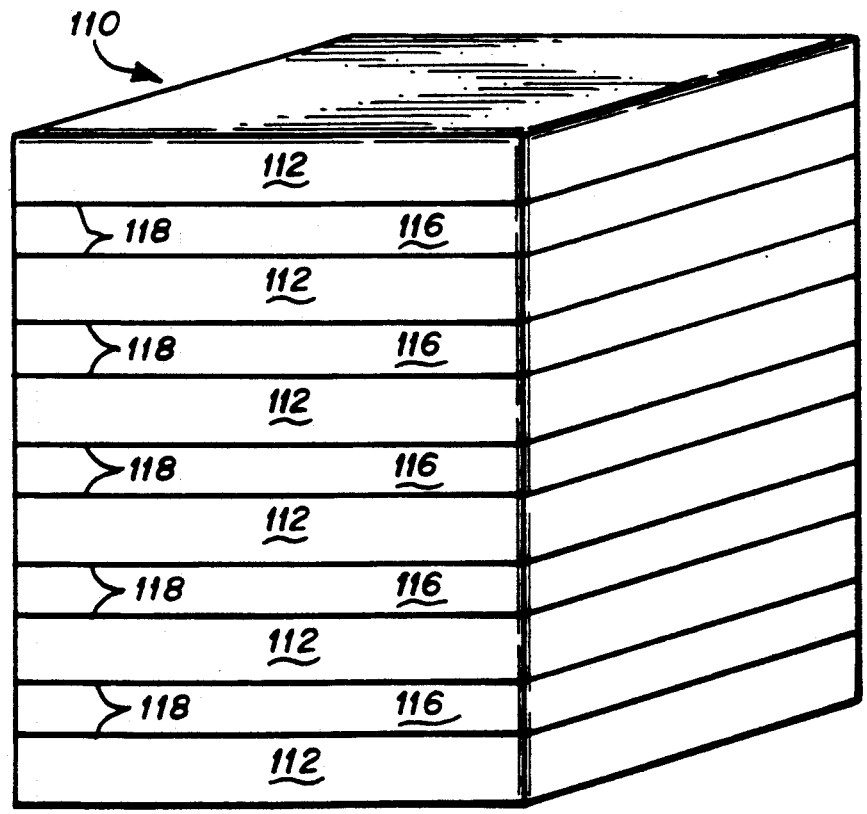
Fig_2

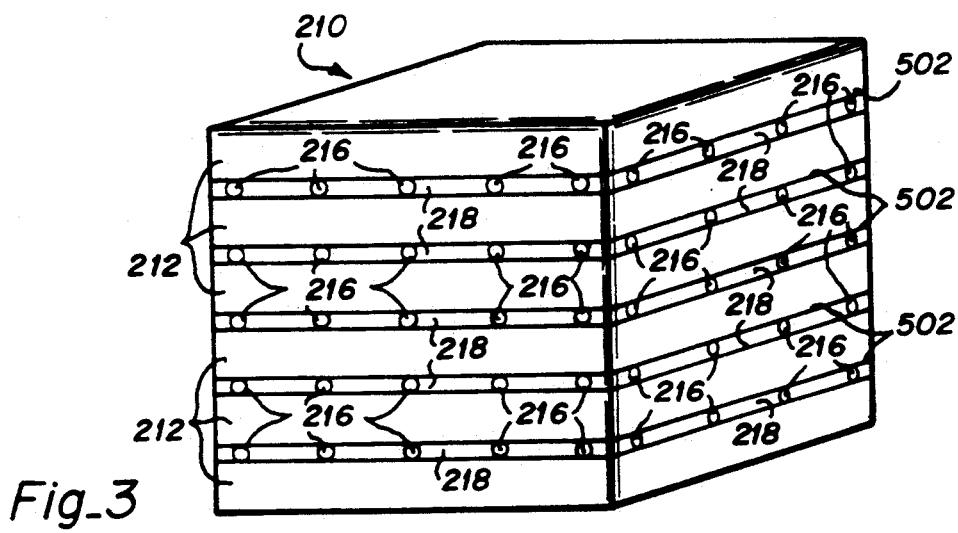
Fig_3
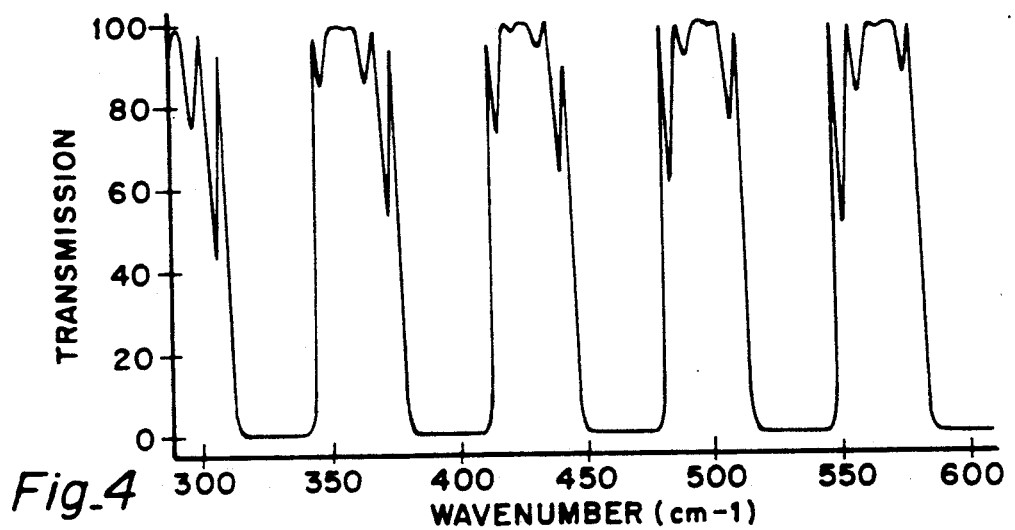
Fig_4
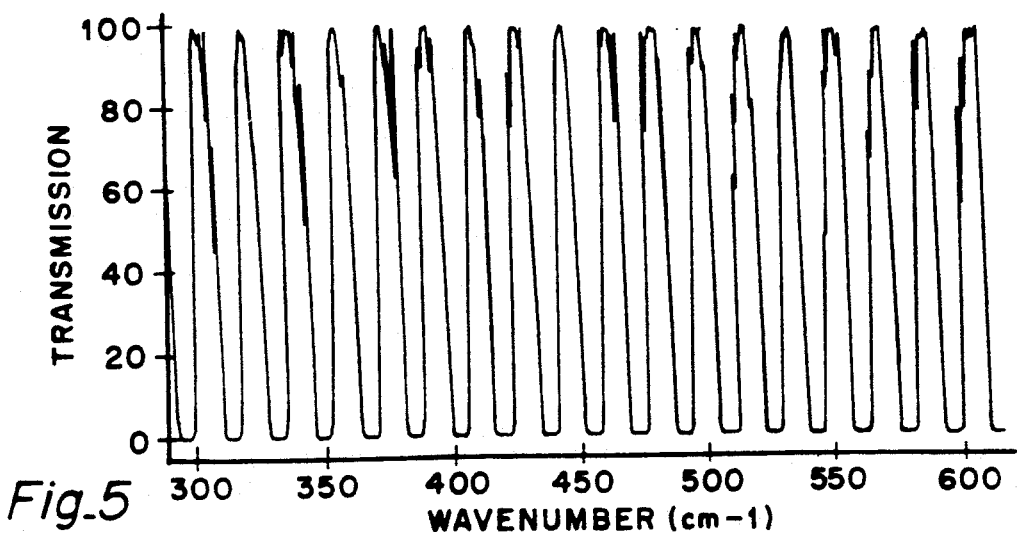
Fig_5

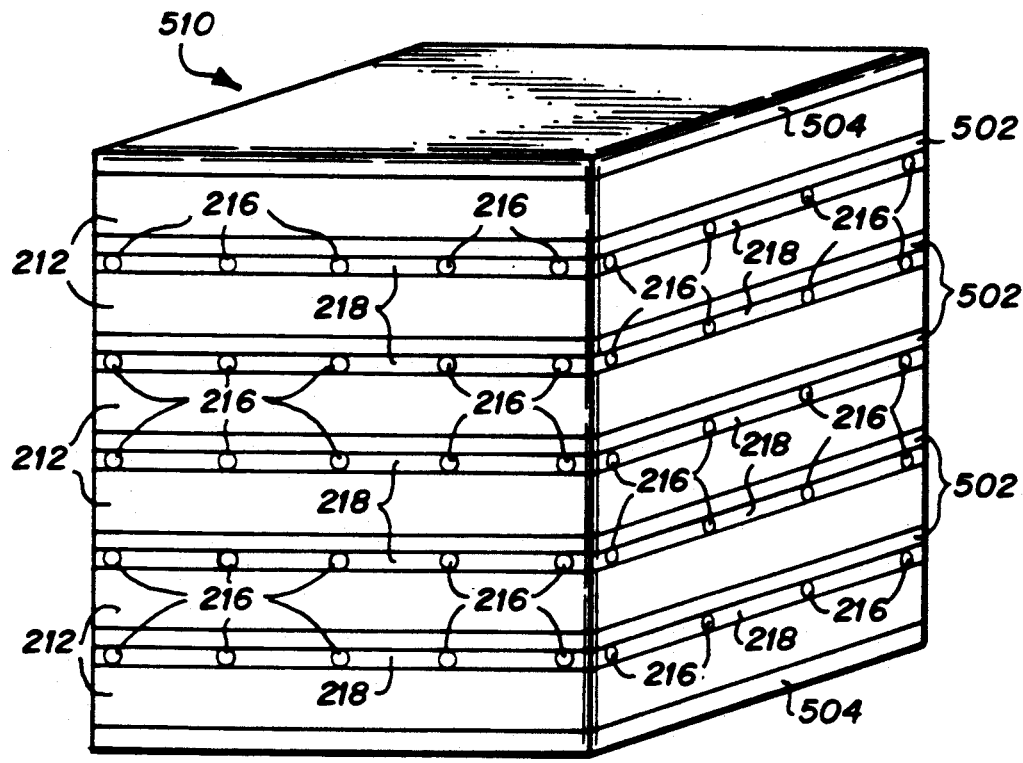
Fig_6
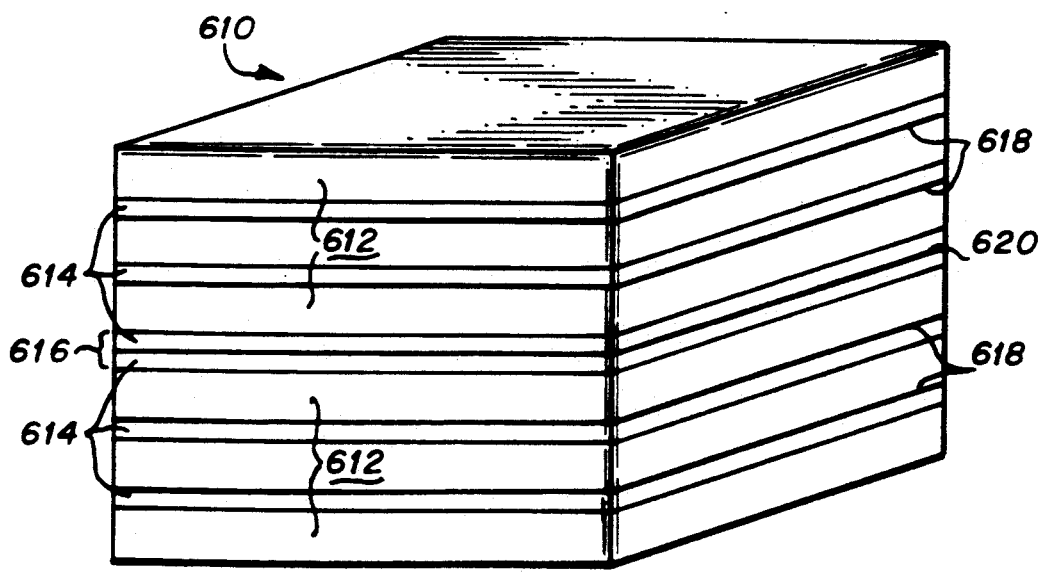
Fig_7

MULTILAYER INFRARED FILTER

BACKGROUND OF THE INVENTION

1. Field of the Invention

The present invention relates generally to infrared filters, and more particularly to infrared filters having a laminated, layered structures and a method for the manufacture thereof.

2. Brief Description of the Prior Art

Far infrared filters have been previously made by vacuum deposition of thick films upon suitable substrates. However, the individual films are typically so thick that intrinsic mechanical stresses cause many failures. Such filters may take three weeks to produce and have only a 30% chance of producing a successful product. Therefore they are expensive, typically costing twenty thousand dollars for a single one inch diameter filter at a wavelength of approximately twenty-five microns.

U.S. patent application 3,551,017 entitled "Far Infrared Transmission Type Interference Filter", issued Dec. 29, 1970 to Toshikatsu Iwasaki, et al., discloses an interference filter having a plurality of layers which are arranged into two sets of layers, (F.A.L.) and (S.A.L.). Each of the layers in the F.A.L. set has an identical optical thickness, and each of the layers in the second set has an identical optical thickness, although the optical thickness of the second set of layers differs from the optical thickness of the first set of layers.

Other prior art known to the inventor includes U.S. Pat. No. 2,660,925, Light Reflector Which Transmits Infrared Rays, issued Dec. 1, 1953 to A. F. Turner which discloses a reflector of e.g. glass coated with germanium, which transmits a relatively large proportion of incident infrared light. U.S. Pat. No. 3,000,375, Semi-conductor Heat Absorption Means, issued Sep. 19, 1961 to M. J. E. Golay which discloses an infrared filter comprising a semiconductor such as germanium or silicon on a base of rock salt. U.S. Pat. No. 3,188,513, Optical Filters And Lamps Embodying The Same, issued Jun. 8, 1965 to R. L. Hansler which discloses an infrared filter having a film of e.g. silicon or germanium coated with a dielectric film. U.S. Pat. No. 3,331,941, Infrared Heater, issued Jul. 18, 1967 to J. W. Edwards et al. which discloses an infrared filter comprising alternate layers of germanium and cryolite on a quartz substrate. U.S. Pat. No. 3,718,533, Composite Sheets For Agricultural Use, issued Feb. 27, 1973 to S. Shibata which discloses a filter for agricultural use employing layers of polypropylene and aluminum. U.S. Pat. No. 4,245,217, Passive Infrared Alarm System, issued Jan. 13, 1981 to P. W. Steinhage which discloses an infrared filter having germanium and dielectric layers. U.S. Pat. No. 4,284,323, Trichroic Mirror, issued Aug. 18, 1981 to G. Jankowitz which discloses a germanium and silicon monoxide infrared filter on a quartz substrate.

SUMMARY OF THE INVENTION

It is an object of the present invention to provide an infrared filter that can be manufactured relatively easily and inexpensively.

It is another object of the present invention to provide an infrared filter that is composed of a plurality of laminated layers.

It is a further object of the present invention to provide an infrared filter that is composed of a plurality of layers which may be individually inspected prior to lamination thereof.

It is yet another object of the present invention to provide a method for manufacturing the filters and the individual layers of materials that make up the layers that is accurate and inexpensive.

The present invention includes a laminated structure that is composed of a plurality of layers each having a uniform and relatively precise thickness. In a first embodiment relatively thick layers of polypropylene sheets are coated with a relatively thin layer of germanium utilizing a vacuum evaporation process. Internal layers of polypropylene are coated on both sides, whereas the upper and lower external layers of polypropylene are coated only on their interior side. The interior surfaces of germanium are then joined together utilizing a hot melt adhesive, and the sandwiched layers are placed in a press with a suitable force to obtain proper lamination and adhesion. The device thus contains a plurality of uniform layers which alternate in thickness. The thickness of the layers is selected to produce a device which will act as an infrared filter in conjunction with the wavelengths of infrared light with which the device will be utilized.

In an alternative embodiment uniform, relatively thick silicon wafers are alternately bonded with uniform, relatively thin polypropylene sheets to form a laminated structure that is suitable for use with differing wavelengths of infrared radiation.

Still another alternative embodiment may be formed utilizing silicon wafers of a uniform, relatively thick structure having uniform, relatively thin glass fibers disposed therebetween. An adhesive is intermixed with the glass fibers to bond the laminated structure together.

It is an advantage of the present invention that it provides an infrared filter that can be manufactured relatively easily and inexpensively.

It is another advantage of the present invention that it provides an infrared filter that is composed of a plurality of laminated layers.

It is a further advantage of the present invention that it provides an infrared filter that is composed of a plurality of layers which may be individually inspected prior to lamination thereof.

It is yet another advantage of the present invention that it provides a method for manufacturing the filters and the individual layers of materials that make up the layers that is accurate and inexpensive.

These and other objects, features and advantages of the present invention will become apparent from the following description of the preferred embodiment and the accompanying drawings.

IN THE DRAWING

FIG. 1 is a perspective view of a preferred embodiment of the present invention;

FIG. 2 is a perspective view of an alternative embodiment of the present invention;

FIG. 3 is a perspective view of another preferred embodiment of the present invention;

FIG. 4 presents transmission data for a device such as that depicted in FIG. 1;

FIG. 5 presents transmission data for a device such as that depicted in FIG. 3;

FIG. 6 is a perspective view of a filter, such as is depicted in FIG. 3, having an internal anti-reflection coating; and FIG. 7 is a laminated filter that is constructed as a band pass filter.

DESCRIPTION OF THE PREFERRED EMBODIMENTS

As depicted in FIG. 1, a first embodiment 10 of the present invention includes a laminated structure of several layers. Each layer is formed with a rather uniform and precise thickness. The relatively thick layers 12 in the first embodiment 10 depicted in FIG. 1 are composed of a low index of refraction material such as a polymer sheet composed of materials such as polypropylene, polyethylene polyester, etc. A preferred material is polypropylene, having a thickness of approximately 20.0 microns, with a thickness variation of 0.3 microns. The interior polymer sheets 14 are coated on each surface with a film 16 composed of a high index of refraction material, such as a germanium, silicon and gallium arsenide. The preferred embodiment includes a germanium film 16 having a thickness of approximately 0.7 microns, with a thickness variation of 0.05 microns. The two external polymer layers 18 and 20 have only an internal film coating 22 and 24 respectively. The various film 16 coated polymer sheets are bonded together with an adhesive 30. In the preferred embodiment 10 the preferred adhesive is composed of Kodak A3 adhesive compound that is approximately 0.2 microns thick. Other adhesives such as paraffin can be utilized, however where the present invention is utilized in a cryogenic environment, the paraffin adhesive generally fails whereas the A3 adhesive generally remains functional. In filters such as the first embodiment 10, the relatively thick polymer layers 12 have a low index of refraction as compared to the relatively thin layers 16 that have a relatively high index of refraction. Such filters are useful in the infrared spectral range of wavelengths from approximately 1.8 microns to approximately 1000 microns, except in those wavelength bands where the layer material is highly absorptive, such as approximately 7 microns and 14 microns for polypropylene. The thickness of the layers 12 and 16 provided hereinabove are generally suited for an infrared filter that is designed for a wavelength range of approximately 15 microns to 30 microns.

As will be understood by those skilled in the art, the relatively thick layers 12 have a thickness corresponding to many quarter wavelength optical thicknesses of the incident radiation, whereas the thin layers 16 have a thickness which corresponds to one quarter wavelength optical thickness of the incident radiation. The close thickness tolerances of the alternating thick layers, as well as the thin layers, produces a laminated structure that has substantial dimensional regularity throughout the overall thickness of the sandwich of layers.

FIG. 4 provides transmission data results for a laminated structure as depicted in FIG. 1 composed of six polypropylene sheets having a thickness of approximately 20.0 microns that are coated with thin films of germanium having a thickness of approximately 0.7 microns, and which are bonded together using Kodak A3 adhesive having a thickness of approximately 0.2 microns. The filter 10 was sandwiched between substrates of polypropylene having an index of refraction of 1.5 as is customarily done by those skilled in the art. The square waveform of FIG. 4, having nearly equal bandwidths transmitted and reflected, and relatively uniform periodicity is useful in many ways. To achieve relatively equal widths of the transmitted bands and the reflected bands, a ratio of high index of refraction to low index of refraction of the first layers 12 to the second layers 16 respectively, equaling 7/3 is preferred.

FIG. 2 depicts an alternative embodiment 110 of the present invention. As with the first embodiment 10, it includes a laminated structure of several layers, each of which layers is formed with a rather uniform and precise thickness. The relatively thick layers 112 are composed of a relatively high index of refraction material such as silicon, and in the preferred embodiment are formed with a thickness of approximately 78.0 microns, with a thickness variation of 0.1 microns. Each of the layers 112 is separated by a second relatively thick layer 116 composed of a material having a relatively low index of refraction. In the preferred embodiment, the layers 116 are composed of polypropylene having a thickness of approximately 20.0 microns, with a thickness variation of 0.3 microns. An adhesive layer 118 composed of an adhesive such as Kodak A3 is disposed between the first layers of silicon and the second layers of polypropylene to bond the structure together. In the preferred embodiment the adhesive layer 118 has a thickness of approximately 0.1 microns. A filter of the type depicted in FIG. 2 is suitable for infrared radiation in the spectral range of wavelengths from approximately 1.8 microns to 1000 microns. The particular embodiment of FIG. 2 having layer thicknesses disclosed hereinabove is suitable for infrared radiation in the wavelength range from approximately 15 microns to 30 microns.

FIG. 3 depicts another alternative embodiment 210 of the laminated infrared filter of the present invention. It includes a plurality of relatively thick layers 212 that are preferably composed of silicon having a thickness of approximately 78.0 microns, with a thickness variation of 0.1 microns. The layers 212 are separated by glass fibers 216 having a thickness of approximately 3.7 microns, with a thickness variation of 0.1 microns. The space 218 between the glass fibers 216 is filled with Kodak A3 adhesive. The thickness of the second layers having the glass fibers 216 is approximately one quarter wavelength optical thickness in the spectral range from 15 microns to 30 microns.

As would be obvious to one skilled in the art, other devices and materials could be used in place of the glass fiber spacers 216 depicted in FIG. 3. For instance, a coating of a material, such as alumina, could be deposited upon the surface of the silicon layer 212, using vacuum deposition, chemical vapor deposition, sputtering or other suitable means, to achieve an appropriate thickness of approximately 3.7 microns. Thereafter, the alumina coating is masked and etched, such that a plurality of small areas having a diameter of approximately 3.7 microns remain on the surface of the layer 212. The small areas then act as spacers in the same manner as the glass fibers 216. The dimensions of the small remaining areas should be less than one quarter wavelength of the infrared radiation, such that absorption and scattering are reduced to an acceptable level, such as approximately one percent per layer. Of course, other types of spacer inserts could be utilized, and the present invention is not to be limited to the particular types of spacers described hereinabove. As an alternative to spacers a layer of a relatively low index of refraction material, such as $PbF_2$ or $ThF_4$ may be utilized. The thickness of such a layer is approximately 3.7 microns, having a thickness variation of approximately 0.1 microns. A layer of Kodak A3 adhesive having a thickness of approximately 0.1 microns is then used to bond the various layers together.

FIG. 5 provides transmission data results for a laminated structure as depicted in FIG. 3 composed of six silicon layers having a thickness of approximately 78.0 microns that are separated by an adhesive layer of Kodak A3 adhesive and glass fibers having a thickness of approximately 3.7 microns. The square waveform of FIG. 5, having nearly equal bandwidths passed and reflected, and relatively uniform periodicity is useful in many ways. To achieve relatively equal widths of the transmitted bands and the refracted bands a ratio of high index of refraction to low index of refraction equaling 7/3 is preferred.

It is possible to increase the effective bandwidth of the filters 10, 110 and 210 beyond the one octave bandwidth depicted in FIGS. 4 and 5 through the utilization of a plurality of anti-reflection coatings within the layers of the filter. Specifically, with regard to the filter 10, an anti-reflection coating layer 302 may be formed on one surface of the polypropylene sheets 12 in the place of the coating thereof with germanium. In the preferred embodiment, the anti-reflection coating is preferably composed of selenium having a thickness of approximately one quarter wave optical thickness at a wavelength of 10 microns. Other materials such as diamond, cesium iodide and KRS 5 (a crystal compound of thallium bromide and thallium chloride) can also be utilized.

The filter 210 may likewise include an anti-reflection coating 502 formed on one inner surface of each silicon layer 212. Such a device is depicted in FIG. 6, wherein similar layers are identified with identical numerals as utilized in FIG. 3. In the preferred embodiment, the filter 510 is formed with anti-reflection coating 502 that is composed of selenium, although diamond, cesium iodide and KRS 5 could be utilized, and is formed with a thickness approximating one quarter wavelength optical thickness at a wavelength of 10 microns. The thickness of the second layer having the adhesive compound 218 of A3 with glass rods 216 or spacers would be reduced to 1.7 microns, which is one quarter wavelength optical thickness at a wavelength of 10 microns. An anti-reflection coating 504 composed of a substance such as polypropylene may also be disposed on the top face and bottom face of the filter 210, as is well known in the art.

A particular variation of the present invention is depicted in FIG. 7. The device of FIG. 7 is similar to a Fabry-Perot band pass filter, and it is similar in materials and construction to the filter 10 depicted in FIG. 1. As depicted in FIG. 7, the band pass filter 610 includes a plurality of first layers 612 composed of a uniform relatively thick, relatively low index of refraction material. The first layers 612 are separated by a series of uniform relatively thin second layers 614 composed of a relatively high index of refraction material. It is to be noted that two relatively thin layers 614 are disposed together to form combined layer 616, which is therefore twice as thick as the layers 614. In the preferred embodiment, the layers 614 are formed by a deposition process on one surface of the layers 612, and a thin adhesive layer 618 is disposed between the surface of the deposited thin layer 614 and the surface of a subsequent first layer 612, such that the sandwich structure 610 is bonded together with the adhesive layers 618. An adhesive layer 620 is also disposed between the two relatively thin layers 614 which comprise the combined layer 616. In the preferred embodiment, the relatively thick layers 612 are formed from a polymer material such as polypropylene, polyethylene or polyester (polypropylene being preferred) having a thickness of approximately 20 microns. The relatively thin layers 614 are formed from a material such as germanium, silicon or gallium arsenide and have a thickness that corresponds to one quarter wavelength optical thickness at the filters tuned wavelength. Thus, for the preferred material of germanium, a thickness of 0.7 microns corresponds to a one quarter wavelength optical thickness at a tuned wavelength of 10 microns.

In discussing each of the preferred embodiments 10, 110 and 210, it has been mentioned that the layers of material utilized in the filters should be of a relatively uniform thickness. The uniformity of thickness is a significant factor in both the performance of individual filters and the ability to inexpensively manufacture filters having uniform and repeatable filtering characteristics. The relatively uniform thickness preferred to herein is generally of the order of 0.1 quarter wavelength optical thickness at the tuned wavelength of the particular filter, which, in the preferred embodiments described herein is 22 microns.

As is known to those skilled in the art, tolerances of the magnitude set forth hereinabove are not generally found in prefabricated materials such as silicon wafers. Thus, particular attention must be paid to the obtaining of materials having the relatively uniform thickness desired.

The fabrication of the first embodiment 10 is commenced by selecting a sheet of polypropylene of low index of refraction, desired thickness and uniformity of optical thickness. The sheet is mounted in a vacuum evaporator and both sides are coated with a film of a high index of refraction material, such as germanium, to a desired thickness, such as 0.7 microns thick. Other sheets are prepared having only one side coated with germanium. The coated sheet is then inspected, using its infrared spectral transmission to gauge absolute optical thickness, uniformity of optical thickness, and to detect coating absorption or thickness errors. A method for the inspection of the thickness of the coated sheets is described hereinafter.

On a hotplate, heat a pair of optical flats, and a portion of adhesive, preferably Kodak A3, a hot melt adhesive made by Eastman Kodak. When the adhesive is molten, the fabrication is commenced by placing onto one of the flats, in the following sequence: a drop of paraffin, a sheet of singly coated polypropylene, coated side up, a drop of A3, a sheet of doubly coated polypropylene. Three cycles of the prior two items (adhesive and doubly coated polypropylene) are next performed, followed by a drop of A3, a singly coated polypropylene layer (coated side down), a drop of paraffin, and finally the second optical flat. This multilayered sandwich is then pressed together for approximately ten seconds using approximately five pounds of force to achieve minimal adherence between the layers.

The entire sandwich, including the optical flats, is then placed on a 30 mm diameter by 2 mm thick teflon pad under a one ton press. Another identical teflon pad is placed on top. Without delay (before the A3 adhesive freezes), the combination is pressed together for thirty seconds, using one thousand pounds of force to achieve lamination of the layers.

After the lamination, the sandwich is allowed to cool for five minutes. Using a single edged razor blade, the combination is cleaved between the optical flat and the first polypropylene sheet. Then using the razor blade at a very small angle to the optical flat's surface, the six-sheet combination is cleaved between the remaining glass flat and the last polypropylene sheet. The resulting filter 10 is then cleaned with acetone using lens tissue or a Q-tip. The resulting laminated filter 10 may be used free standing or sandwiched between substrates. FIG. 1 shows the freestanding lamination.

As for the devices 110 and 210, silicon wafers are fabricated to the layer thickness desired utilizing a grinding and polishing procedure that includes the mounting of relatively thick silicon wafers on coated blocking plates. To produce coated blocking plates, grind and polish fused quartz blanks 150 mm diameter by 50 mm thick. The back surface may be a commercial polish, but the front surface should be flat to 0.25 wavelength at 0.546 micron. The front surface is then coated by vacuum evaporation, sputtering or some other appropriate means to have about forty percent reflection in the visible. A trilayer of zirconia, alumina, and zirconia was used, wherein each layer was one quarter wavelength optical thickness at 0.55 micron. Zirconia was chosen for its mechanical durability as was alumina. The goal is about 40 percent reflection and durability to withstand several cycles of the blocking process.

To fabricate silicon discs as thin as 60 microns, flat and parallel to 0.1 micron, coated quartz blocking plates as described above are used. Obtain or fabricate, using standard optical procedures, single crystal silicon discs ground and polished flat to one quarter wavelength at 0.546 micron. Their thickness should be at least one eighth of their diameter Block these discs using color contact onto a blocking plate. The procedure described below, although not necessary, was designed to ease this blocking process.

To color contact silicon discs, 25 mm diameter by 4 mm thick, onto a 150 mm diameter by 25 mm thick fused quartz blocking plate, start with silicon discs as described above and a coated blocking plate as described above. Put the blocking plate coated side up on a hot plate. Heat it until paraffin melts on its surface. Flood the surface with molten paraffin. Illuminate the bottom surface with a low pressure mercury lamp filtered to 0.546 micron.

Place a silicon disc on the molten paraffin and press on it until green fringes are seen from underneath. These are formed between the silicon surface and the coating on the blocking plate. They are very high contrast and easy to see because the coating's reflection is comparable to silicon's. To facilitate this observation, put 0.546 micron source adjacent to the hot plate, facing upward. Elevate the blocking plate about 100 mm above the hot plate, supporting it in a metal frame or on a glass plate. Put a mirror facing upward adjacent to the hot plate, opposite the spectral lamp. With this setup, you may look into the mirror and see the fringes formed under the silicon discs.

Further pressing broadens the green fringes and finally produces colored fringes which can be seen in fluorescent light from a typical light fixture. Once all the discs (typically 19, 37 or 61) are blocked in this manner, they are further pressed, to broaden the colored fringe and make it uniform. Allow the paraffin to freeze and check that the underside still displays broad colored fringes under fluorescent light illumination. It has been useful to clean the paraffin from between the silicon discs using a tissue dampened with acetone, then painting a chamfer of lacquer around each silicon disc. The lacquer protects the paraffin and the edge of the wafer from undue attack by the grinding and polishing compounds.

The color-contacted block of silicon discs is ground and polished using conventional optical procedures to a thickness of 60+ −0.1 microns. This parallelism, while not common in the optical field, is done using well known procedures. This precision in absolute thickness is even less common. A micrometer measurement gets you to 61+ −0.5 microns, then spectral measurement of one disc carefully removed from the block, indicates its thickness to 0.1 micron. For example, if the discs are still too thick by one half micron, then the removal of 0.5/0.546 wavelengths of material at 0.546 micron is conducted. This translates to removing three fringes, which is measurable using standard interferometric procedures.

In a preferred embodiment to determine the precise absolute thickness of a silicon wafer, one measures its infrared transmission between 16 and 34 microns. This spectrum should be a normal interference pattern with many peaks. Choose a peak near 16 microns and designate the wavelength of that peak $\lambda_o$. Upon inspecting the region near $2\lambda_o$, either a peak or a valley will exist. Not counting the valley very near $2\lambda_o$, count the number of valleys between $\lambda_o$ and $2\lambda_o$, and call this number p. Now write down the indicated optical thickness which is p $\lambda_o$ if $2\lambda_o$ exhibits a peak. If the transmission at $2\lambda_o$ is a valley, the indicated optical thickness is (p+0.5) $\lambda_o$. The physical thickness can then be calculated by multiplying the optical thickness by the index of refraction of silicon at $\lambda_o$. The measurement of the thickness of the polymer sheets utilized in various embodiments disclosed herein can also be accomplished utilizing this procedure.

The filter 110 is fabricated utilizing the silicon layers produced utilizing the method above-described. The wafers 112 are alternated with a layer 118 of A3 Kodak adhesive, a polypropylene sheet 116 and another layer 118 of A3 adhesive. The sandwich device is then placed in a one ton press for approximately 30 seconds to create the laminated filter 110.

The filter embodiment 212 includes silicon layers laminated with adhesive layers of controlled thicknesses. The thickness of the adhesive layer is controlled by spacers such as the glass fibers 216 alumina deposits, or a layer of PbF$_2$ or ThF$_4$, as discussed above. To produce an adhesive containing glass rod spacers, mix 10 milligrams of glass rods (3+ −0.1 micron diameter by 10+ −1 micron long, obtained from Nippon Electric Glass Co. (TM)) into one gram of molten Kodak (TM) A3 adhesive. Stir until it looks uniformly turbid. The resulting solution is less than one half of one percent by volume glass. When pressed between optically smooth and flat surfaces, it will stop at a thickness of three microns, at which time glass will obscure less than one percent of the surface area. Transmission loss due to absorption and scattering by the glass spacers is thus less than one percent per spaced adhesive layer.

The lamination process of the present invention allows individual layers to be inspected and qualified prior to lamination. This process, unlike vacuum deposition, gets easier as the wavelength of the infrared radiation gets longer because the individual layers become thicker and easier to handle. This process allows inexpensive lamination of coated sheets to produce a filter, as compared to the expensive, time consuming and low output processes which currently require vacuum evaporation and deposition processes to produce the relatively thick layers necessary for an infrared filter.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. An infrared filter comprising:
   a plurality of substantially identical first layers;
   a plurality of substantially identical second layers;
   said first layers and said second layers being interleaved, such that at least one said second layer is disposed between each said first layer;
   each said first layer and each said second layer being substantially planar and having a substantially uniform physical thickness;
   the material comprising said first layers having a different refractive index from the material comprising said second layers;
   said first layers having a different optical thickness from said second layers;
   said material comprising said first layers having a higher index of refraction than said material comprising said second layers;
   said material comprising said first layers being silicon, and said material comprising said second layers being an adhesive compound;
   wherein a plurality of spacers are disposed within each said second layers to separate said first layers; and
   wherein each of said second layers has a thickness of approximately one quarter wavelength optical thickness at a particular tuned wavelength and said thickness of said first layers is at least a plurality of quarter wavelength optical thicknesses.

2. An infrared filter comprising:
   a plurality of substantially identical first layers;
   a plurality of substantially identical second layers;
   said first layers and said second layers being interleaved, such that at least one said second layer is disposed between each said first layer;
   each said first layer and each said second layer being substantially planar and having a substantially uniform physical thickness;
   the material comprising said first layers having a different refractive index from the material comprising said second layers;
   said first layers having a different optical thickness from said second layers;
   said material comprising said first layers having a lower index of refraction than said material comprising said second layers; said material comprising said first layers being polypropylene, and said material comprising said second layers being germanium; and
   wherein said polypropylene first layers are formed with a thickness of approximately 20 microns, and wherein two said germanium second layers are disposed between each of said first layers, and wherein each said germanium layer is formed with a thickness of approximately 0.7 microns; and wherein a layer of adhesive compound is disposed between said two germanium second layers to bond said layers together.

3. An infrared filter comprising:
   a plurality of substantially identical first layers;
   a plurality of substantially identical second layers;
   said first layers and said second layers being interleaved, such that at least one said second layer is disposed between each said first layer;
   each said first layer and each said second layer being substantially planar and having a substantially uniform physical thickness;
   the material comprising said first layers having a different refractive index from the material comprising said second layers;
   said first layers having a different optical thickness from said second layers; and
   wherein at least one interior surface of said first layers is contacted with an anti-reflection coating.

4. An infrared filter as described in claim 3 wherein the thickness of said anti-reflective coating is one quarter wavelength optical thickness at a particular tuned wavelength.

5. An infrared filter as described in claim 3 wherein said anti-reflection coating is composed of a material from the group consisting of selenium, diamond, cesium iodide and KRS 5.

6. An infrared filter comprising:
   a plurality of substantially identical first layers;
   a plurality of substantially identical second layers;
   said first layers and said second layers being interleaved, such that at least one said second layer is disposed between each said first layer;
   each said first layer and each said second layer being substantially planar and having a substantially uniform physical thickness;
   the material comprising said first layers having a different refractive index from the material comprising said second layers;
   said first layers having a different optical thickness from said second layers; and
   wherein the thickness of each said second layer is approximately one quarter wavelength optical thickness at a particular tuned wavelength, and the thickness of each said first layer is at least a plurality of quarter wavelength optical thicknesses.

7. An infrared filter comprising:
   a plurality of substantially identical first layers;
   a plurality of substantially identical second layers;
   said first layers and said second layers being interleaved, such that at least one said second layer is disposed between each said first layer;
   each said first layer and each said second layer being substantially planar and having a substantially uniform physical thickness;
   the material comprising said first layers having a different refractive index from the material comprising said second layers;
   said first layers having a different optical thickness from said second layers;
   wherein the thickness of at least one of said second layers disposed between said first layers is approximately two quarter wavelength optical thicknesses at a particular tuned wavelength, and the thickness of others of said second layers is approximately one quarter wavelength optical thickness, and the thickness of each said first layers is at least a plurality of quarter wavelength optical thicknesses.

8. A method for manufacturing an infrared filter comprising the steps of:

fabricating a plurality of first layers formed from wafers having a substantially uniform thickness;

placing a plurality of second layers between said first layers in an interleaved sandwich structure;

applying an adhesive between said first layers and said second layers within said sandwich structure;

applying pressure to said sandwich structure to create a laminated filter;

said wafers being formed utilizing a grinding and polishing process to achieve a uniform, substantially identical thickness for each of said wafers;

said wafers comprising said first layers being composed of a material having a relatively high index of refraction and wherein said second layers are composed of a material having a relatively low index of refraction; and wherein said first layers are composed of silicon and said second layers are composed of an adhesive compound, and wherein spacers are disposed within each said second layer to separate said first layers.

9. A method for manufacturing an infrared filter as described in claim 8 wherein said spacers are composed of glass fibers.

10. A method for manufacturing an infrared filter as described in claim 8 wherein said spacers are composed of small islands of solid material.

11. A method for manufacturing an infrared filter as described in claim 8 wherein said spacers are formed from a coating of a relatively low index of refraction material disposed upon an interior surface of each said wafer.

12. A method for manufacturing an infrared filter as described in claim 11 wherein said coatings are composed of either $PbF_2$ or $ThF_4$.

* * * * *